UNITED STATES PATENT OFFICE.

ELONZO S. WHEELER, OF WESTPORT, CONNECTICUT.

IMPROVED COMPOSITION FOR BUTTONS.

Specification forming part of Letters Patent No. 50,974, dated November 14, 1865.

*To all whom it may concern:*

Be it known that I, ELONZO S. WHEELER, of the town of Westport, county of Fairfield, and State of Connecticut, have invented a new and Improved Composition for Buttons, Daguerreotype-Cases, Boxes, and other articles usually made of horn or hard india-rubber; and I do hereby declare that the following is an exact description thereof.

The manner in which I prepare my composition is as follows: Upon a metallic plate heated by steam I place about five ounces of shellac. As soon as the shellac becomes sufficiently softened by the heat, I mix with the shellac about one pound of barytes, ground fine. When the shellac and barytes are thoroughly mixed together, I then roll the compound into a sheet of the proper thickness, punch out the pieces of the proper size for buttons, or any other article desired. The blanks thus punched or cut out are then placed in heated molds or dies and subjected to a pressure in the same manner that buttons and similar articles are manufactured from horns, hoofs, &c.

The natural color of my composition is of a dark-brown; but any desired color except light colors may be given to the composition by mixing with it any suitable coloring material. The proportions of shellac and barytes need not necessarily be precisely as above stated, but may be varied. I find, however, that five ounces of shellac to one pound of barytes produces an excellent composition, and that the buttons and other articles made from it in hot dies come out with a very high polish.

Having thus described my invention, what I claim therein as new, and desire to secure by Letters Patent, is—

A new composition of shellac and barytes, in such proportions as will produce buttons and other articles with a high degree of polish, substantially as described.

ELONZO S. WHEELER.

Witnesses:
    JONT. E. WHEELER,
    R. N. WHEELER.